Sept. 14, 1948.        T. S. DONNELLY        2,449,370
ELECTRODE HOLDER
Original Filed Jan. 29, 1944
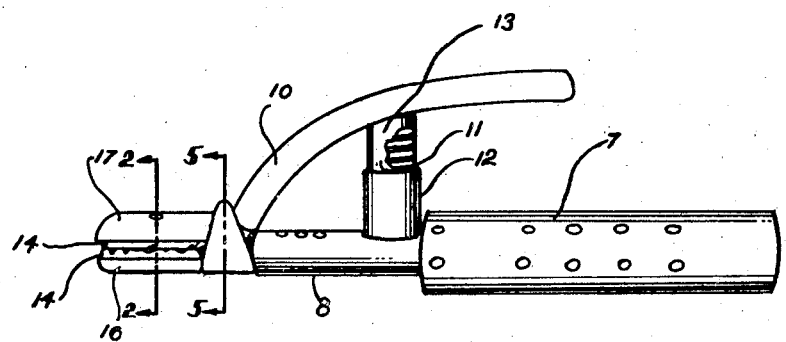
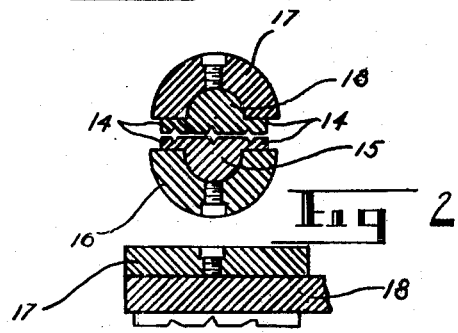
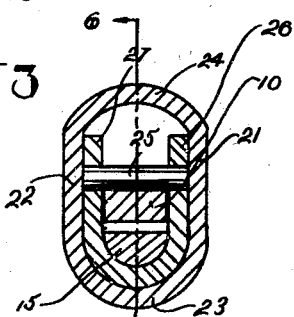
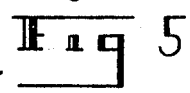
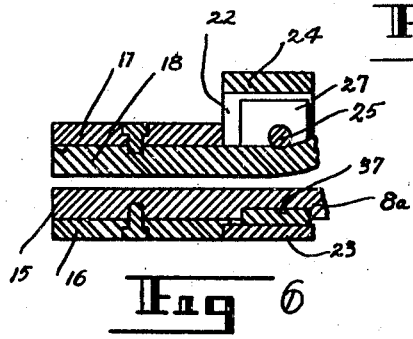
INVENTOR.

Patented Sept. 14, 1948

2,449,370

UNITED STATES PATENT OFFICE 2,449,370

ELECTRODE HOLDER

Thomas S. Donnelly, Detroit, Mich.

Continuation of application Serial No. 520,346, January 29, 1944. This application April 12, 1946, Serial No. 661,518

8 Claims. (Cl. 219—8)

1

This application constitutes a continuation of my pending application Serial #520,346, filed January 29, 1944.

My invention relates to a new and useful improvement in an electrode holder adapted for use in arc welding operations. The invention relates to features which are used on electrode holders of a specific design and also to features which may be used on electrode holders of various designs. In electrode holders used for arc welding purposes, it is quite common to insulate the gripping jaws. This insulation is generally accomplished by mounting a suitable insulating material on the jaws so as to cover the exposed surfaces thereof and reduce the likelihood of contacting the jaws against a live body. A common way is the mounting of a flat plate on the back face of the jaws and of sufficient width to project outwardly beyond opposite sides of the jaws. Another commonly used method is to mount a channel member on the jaws, this channel member being U-shaped in cross-section so that the side walls of the channel member overlie the side faces of the jaws. Both methods have proven objectionable. The jaws are sometimes made of such thickness that the side plates leave a large portion of the side faces of the jaws exposed. With the channel-shaped construction, having the oppositely disposed side walls overlying the side faces of the jaws, many objectionable features are present. Particularly among these is the fact that the side members break off very easily and since these side members are extended at right angles to the back member, the molten metal and slag or weld, commonly termed "spatter," is permitted to adhere with the result that the insulation burns off rapidly.

It is an object of the present invention to provide in an electrode holder a pair of jaws having insulation mounted thereon so arranged and constructed that these various disadvantages may be avoided.

It is another object of the present invention to provide in an electrode holder a pair of jaws having insulation mounted thereon arranged and constructed in such a manner that a thrust delivered to the insulation will be transmitted around the insulation and not localized on any particular part.

Another object of the invention is the provision of jaws in an electrode holder so constructed and arranged that a blow delivered to the insulation will be resisted along the edge of the insulation over a wide area instead of directed against the securing means.

2

Another object of the present invention is the provision of a pair of jaws adapted for movable relation to each other and having insulation mounted thereon provided with a curvilinear outer surface.

Another object of the invention is the provision in an electrode holder of a pair of jaws consisting of a central jaw having a curvilinear surface and provided with a flange projecting outwardly from outward edges thereof.

In a certain type of electrode holder, a pair of prongs are pivotly connected together intermediate their ends and the portions thereof extending forwardly therefrom constitute the gripping jaws. These gripping jaws are normally held in gripping relation by means of a spring forcing the rear ends of the prongs into separate relation. The pivot pin is usually projected through a pair of lugs which are formed integral either with the upper prong or with the lower prong. These lugs are generally left exposed and it is an object of the present invention to provide an electrode holder having insulation mounted on the lugs to prevent their contact from live bodies and protect them against being burned off.

Another object of the invention is the provision of an electrode holder of this class having lug forming members which are detachable from both of the prongs so that when they are burned off or destroyed, they may be easily and quickly removed and replaced.

Another object of the invention is the provision in an electrode holder of a pair of pivot lugs detachably mounted on the prongs and having an endless bank of insulation material surrounding the same.

Another object of the invention is the provision in an electrode holder having a pair of separated lugs with a pivot pin extended therethrough of an insulating member covering the lugs at opposite sides of the pivot pins and serving as a means of retaining the pivot pin in operative position.

Other objects will appear hereinafter.

It is recognized that various changes and modifications may be made in the detail of structure illustrated without departing from the invention and it is intended that such variations and modifications shall be embraced within the scope of the appended claims.

Forming a part of this specification are drawings in which:

Fig. 1 is a side elevational view of an electrode holder embodying the invention with a part broken away.

Fig. 2 is a sectional view taken on line 2—2 of Fig. 1.

Fig. 3 is a longitudinal fragmentary sectional view of one of the jaws.

Fig. 4 is perspective view of one of the insulating plates used in the invention.

Fig. 5 is a sectional view taken on line 5—5 of Fig. 1.

Fig. 6 is a fragmentary sectional view taken on line 6—6 of Fig. 5.

Fig. 7 is a sectional view similar to Fig. 2 showing a slight modification.

In the drawings I have illustrated the electrode holder comprising a handle 7, a lower prong 8a covered with a covering of insulation 8, the prong 8a is formed from electricity conducting material. An upper prong 10 is pivotly mounted on the prong 8a and normally held in the position shown in Fig. 1 by means of the coil spring 11 operating in the telescoping insulating cups 12 and 13. The outer end of the prong 10 is formed into a portion 18 which, as shown in Fig. 2, is substantially semi-circular in cross-section to provide a curvilinear back. The prong 8a is also extended to form a jaw portion 15 which also is substantially semi-circular in cross-section to provide a curvilinear back surface. These portions 15 and 18 are provided at opposite sides with the outwardly extending flanges 14. Mounted on these jaw portions are insulation plates 16 and 17 which are similarly constructed and secured in position by a screw or other fastening means projected through a suitable opening formed in the insulation plate. As clearly appears from Fig. 2, these insulation plates are substantially semi-circular in cross-section to provide a curvilinear outer surface and a curvilinear inner surface which lies flat upon the portions 15 and 18. The edges of these insulation plates lie in engagement with the faces of the flanges 14. With the jaws insulated in this manner, the thrust delivered against the plates 16 and 17 are not localized because of the curvilinear construction of these insulation plates but the thrust is transmitted over a wide area. Moreover, a blow which would tend to move the insulation plate sideways would not be resisted solely by the screw or securing means which retains the insulation plate in position on the member 15 or 18 but is resisted through the engagement of the edge of the insulation plate with the flange 14. By forming the insulation plates with a curvilinear exposed face, the likelihood of slag or spatter clinging thereto is reduced to a minimum.

In order to mount the prong 10 pivotly on the prong 8a, I provide a yoke, the legs 26 and 27 of which serve as a mounting for the pivot pin 25 beneath which the prong 10 is extended. It is believed obvious that, if desired, the pivot pin 25 may be extended through an opening formed in the member 10. This yoke member, the legs 26 and 27, merely embraces the lower prong and is not fastened thereto. It cannot become dislodged because there is always an upwardly directed pressure on the pin 25 tending to hold the yoke member in snug engagement with the portion 15.

Mounted on the yoke so as to entirely cover the same is an endless band of suitable insulating material, such as fiber, plastic or the like. The upper and lower portions 23 and 24 are preferably curved, as shown, and the side portions 21 and 22 lie in snug engagement with the legs 26 and 27 so as to cover and protect the same. It will be noted from Fig. 5 that these portions 21 and 22 serve also to retain the pin 25 in position and prevent its longitudinal displacement.

The insulation plates 16 and 17 serve also to retain the band of insulating material in position, as does likewise the insulation tube 8, as these members engage the band of insulation material at its opposite side. With an electrode holder constructed in this manner, the disadvantages referred to are avoided and among the advantages obtained are those which have already been mentioned.

In Fig. 7, I have shown a structure in which the jaw-forming portions 18a and 15a are provided with the insulation plates 17a and 16a, held in position by the screws 35 and 36. In this form, the flanges 14 of Fig. 2 have been eliminated.

In Fig. 6, I have shown the lower prong 8a provided with a recess 37 in which engages the yoke.

What I claim as new is:

1. In an electrode holder of the class described, a pair of relatively movable gripping jaws for gripping an electrode therebetween, each jaw having a portion substantially semi-circular in cross-section; and an insulating member having an outer surface substantially semi-circular in cross-section mounted on and covering said portion.

2. In an electrode holder of the class described, a pair of relatively movable jaws adapted for gripping an electrode therebetween, each jaw comprising a portion curvilinear in cross-section; and an insulating member for each of said jaws and mounted on said curvilinear portion and substantially covering the same, the outer surfaces of said insulating members being curvilinear.

3. In an electrode holder of the class described, a pair of relatively movable jaws adapted for gripping an electrode therebetween and comprising a central body formed substantially semi-circular in cross-section; a flange projecting outwardly from opposite sides of said body and extending longitudinally thereof; an insulating member having an inner surface conforming to the outer surface of said body and mounted thereon and covering the same, said insulating member having a curvilinear outer surface and being of a thickness greater than the width of said flanges and engaging one face thereof and projecting outwardly beyond the same.

4. In an electrode holder of the class described, a pair of relatively movable gripping jaws for gripping an electrode therebetween, each comprising an elongated body substantially semi-circular in cross-section; an outwardly projecting flange on opposite sides of each of said jaws; an insulating member for each of said jaws, having an inner surface conforming to the outer surface of said jaw and mounted thereon for covering the same and engaging at its edges one of the faces of said flanges and having a curvilinear outer surface.

5. In an electrode holder of the class described, a pair of relatively movable gripping jaws for gripping an electrode therebetween and comprising an elongated body substantially semi-circular in cross section; a flange projecting outwardly from opposite edges of said jaw; an insulating member of concave formation and having its inner surface conforming to the outer surface of said jaw and mounted thereon in snug engagement therewith and engaging at its edges one of the faces of said flanges and projecting outwardly beyond the outer faces of said flanges and formed with a curvilinear outer surface.

6. In an electrode holder of the class described, a pair of prongs, each of said prongs formed adjacent one end to provide a gripping jaw for gripping an electrode therebetween; a separate yoke positioned over one of said prongs and engaging at its bight therewith rearwardly of the jaw thereon; a pivot pin projected through the legs of said yoke for pivotly connecting said prongs together; an insulated covering, covering said yoke and closely overlying opposite ends of said pin; and an insulating plate mounted on the jaw-forming portions of said prongs and preventing forward movement of said yoke and covering on said prongs.

7. In an electrode holder of the class described, a pair of prongs, each of said prongs formed adjacent one end to provide a gripping jaw for gripping an electrode therebetween; a separate yoke positioned over one of said prongs and engaging at its bight therewith; a pivot pin projected through the legs of said yoke for pivotly connecting said prongs together; an insulating covering, covering said yoke and closely overlying opposite ends of said pin; an insulating plate mounted on the jaw-forming portions of said prongs and preventing forward movement of said yoke and covering on said prongs; and an insulating member mounted on one of said prongs and preventing movement of said covering and said yoke in the opposite direction.

8. In an electrode holder of the class described, a pair of relatively movable jaws adapted for gripping an electrode therebetween and normally spring pressed into close approach; an insulating member mounted on the outer face of said jaws for insulating the same thermally and electrically and having a curvilinear outer surface forming an arc in cross-section.

THOMAS S. DONNELLY.

REFERENCES CITED

The following references are of record in the file of this patent:

UNITED STATES PATENTS

| Number | Name | Date |
|---|---|---|
| 2,003,196 | Jackson | May 28, 1935 |
| 2,056,045 | Fousek et al. | Sept. 29, 1936 |
| 2,200,947 | Bourque | May 14, 1940 |
| 2,322,077 | Wells | June 15, 1943 |
| 2,377,047 | Siemers | May 29, 1945 |